US012522388B1

(12) United States Patent
Choi et al.

(10) Patent No.: US 12,522,388 B1
(45) Date of Patent: Jan. 13, 2026

(54) MOBILE DRONE STATION WITH VEHICLE AND TRAILER

(71) Applicant: DRIVETECH CO., LTD., Gyeonggi-do (KR)

(72) Inventors: Yun Yong Choi, Gyeonggi-do (KR); Myeong Gyun Choi, Gyeonggi-do (KR)

(73) Assignee: DRIVETECH CO., LTD., Gyeonggi-do (KR)

( * ) Notice: Subject to any disclaimer, the term of this patent is extended or adjusted under 35 U.S.C. 154(b) by 0 days.

(21) Appl. No.: 19/049,521

(22) Filed: Feb. 10, 2025

(30) Foreign Application Priority Data

Jan. 3, 2025 (KR) .................. 10-2025-0000576

(51) Int. Cl.
*B64U 70/93* (2023.01)
*B64U 50/31* (2023.01)

(52) U.S. Cl.
CPC ............. *B64U 70/93* (2023.01); *B64U 50/31* (2023.01)

(58) Field of Classification Search
CPC ........ B64U 70/93; B64U 70/95; B64U 70/90; B64U 80/86; B64U 80/80; B64U 80/70; B64U 80/25; B64U 2101/10; B60J 7/04; B60J 7/041; B60P 3/11
USPC ........................................................ 280/656
See application file for complete search history.

(56) References Cited

U.S. PATENT DOCUMENTS

| | | | | |
|---|---|---|---|---|
| 3,897,100 A | * | 7/1975 | Gardner | B60J 7/041 |
| | | | | 296/156 |
| 5,971,561 A | * | 10/1999 | Fitzwater | B64F 1/18 |
| | | | | 362/153.1 |
| 10,397,495 B1 | * | 8/2019 | Graber | B64F 1/24 |
| 12,312,107 B2 | * | 5/2025 | Gilbert-Eyres | B64U 80/86 |
| 2009/0314883 A1 | * | 12/2009 | Arlton | B64U 80/40 |
| | | | | 244/63 |
| 2016/0244187 A1 | * | 8/2016 | Byers | A47G 29/14 |
| 2016/0364989 A1 | * | 12/2016 | Speasl | G08G 5/57 |
| 2019/0023416 A1 | * | 1/2019 | Borko | G06F 3/041 |
| 2020/0175471 A1 | * | 6/2020 | Tsuruta | G06Q 10/0838 |
| 2021/0197982 A1 | * | 7/2021 | Sweeny | B64F 1/222 |
| 2021/0203269 A1 | * | 7/2021 | Kasefang | H02S 10/40 |
| 2021/0224739 A1 | * | 7/2021 | Sweeny | B64U 80/25 |
| 2022/0396421 A1 | * | 12/2022 | Tian | B62D 63/061 |
| 2023/0091643 A1 | * | 3/2023 | Mao | B64U 70/93 |
| | | | | 414/570 |
| 2024/0391615 A1 | * | 11/2024 | Gilbert-Eyres | B64U 70/93 |
| 2025/0108935 A1 | * | 4/2025 | Johnson | B60L 53/22 |

FOREIGN PATENT DOCUMENTS

| | | | | | |
|---|---|---|---|---|---|
| CN | 111803838 A | * | 10/2020 | ............ | B64U 80/86 |
| CN | 119240051 A | * | 1/2025 | ............ | B64U 70/93 |
| CN | 119262386 A | * | 1/2025 | ............ | B64U 80/40 |
| CN | 119568456 A | * | 3/2025 | ............ | B64U 80/20 |
| KR | 20220025968 A | * | 3/2022 | ............ | B64U 80/86 |

(Continued)

*Primary Examiner* — Arfan Y. Sinaki
(74) *Attorney, Agent, or Firm* — Troutman Pepper Locke LLP; Scott D. Wofsy; Gabrielle L. Gelozin

(57) ABSTRACT

The mobile drone station may include a trailer including a mounting region configured such that a drone lands thereon, and cover configured to surround the mounting region, a storage disposed in the trailer and configured to store power to charge a battery mounted in the drone, and a vehicle connected to the trailer to tow the trailer.

14 Claims, 9 Drawing Sheets

(56) References Cited

FOREIGN PATENT DOCUMENTS

| KR | 20230024576 A | * | 2/2023 | ............. B64U 70/93 |
| KR | 102630849 B1 | * | 1/2024 | ................ B60P 3/11 |
| WO | WO-2020226591 A1 | * | 11/2020 | ............. B64U 80/86 |
| WO | WO-2024263108 A1 | * | 12/2024 | ............. B64U 80/86 |

* cited by examiner

MOBILE DRONE STATION WITH VEHICLE AND TRAILER

CROSS-REFERENCE TO RELATED APPLICATION

This application claims under 35 U.S.C. § 119(a) the benefit of priority from Korean Patent Application No. 10-2025-0000576 filed on Jan. 3, 2025, the entire contents of which are incorporated herein by reference.

BACKGROUND

(a) Technical Field

The present disclosure relates to a mobile drone station capable of allowing a drone to be placed and charged thereon through a trailer attached to a movable vehicle. More particularly, it relates to a drone station capable of relaying communication between a drone and an external device and recognizing the position of the drone in real time.

(b) Background Art

Unmanned aerial vehicles (UAVs) and urban air mobility (UAM) aircrafts are collectively referred to as drones. Drones were previously used for military purposes, but they are now being used in a variety of fields, including science and technology, communications, delivery, and photography. Specifically, drones are used to secure or inspect facilities, such as bridges, buildings, solar panels, railways, roads, dams, and waterways. In addition, drones are used to monitor crops, check crop growth status, plant seeds, and spray fertilizers. Furthermore, recently, drones have become increasingly useful to the general public, such as for logistics delivery, emergency medical supplies delivery, delivery to local areas, such as islands, and food delivery.

Existing drones have some limitations in flight time, work range, recharging, and movement due to limitations in battery technology. In plain terms, drones are manufactured as lightly or as small as possible, the battery capacities thereof are limited, and thus, they are not suitable to travel long distances. To overcome the limitations in drone movement, there is a need for drone stations for charging drones, but drone stations developed up to date have simply served as landing sites for drones and as mobile batteries for manual charging of drones.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art, and it is an object of the present disclosure to provide a mobile drone station capable of allowing a drone to be stably placed, transported, and charged thereon through a trailer attached to a movable vehicle.

It is another object of the present disclosure to provide a mobile drone station capable of complementing the limitations of batteries used in drones and the limitations of the communication range of drones.

In one aspect, the present disclosure provides a mobile drone station including a trailer including a mounting region configured such that a drone lands thereon, and cover configured to surround the mounting region, a storage disposed in the trailer and configured to store power to charge a battery mounted in the drone, and a vehicle connected to the trailer to tow the trailer.

In a preferred embodiment, the cover may be moved along a cover guide mounted on the trailer and configured to extend in one direction, and, when the cover is moved in the one direction, the mounting region may be exposed outside.

In another preferred embodiment, at least one roller may be disposed on one surface of the cover guide, and the cover may be moved in the one direction through the at least one roller.

In still another preferred embodiment, a module configured such that devices for communication or control of the cover are mounted therein may be disposed on the mounting region, and, when the cover is located above the mounting region, the module may be provided in a direction opposite to a direction of extension of the cover guide to block one side of the cover.

In yet another preferred embodiment, the cover guide may extend toward the vehicle, and, when the cover is moved along the cover guide and placed above the vehicle, a lower end of the cover may be spaced apart from an upper surface of the vehicle.

In still yet another preferred embodiment, the cover mat include two wing-door type covers configured to be moved in a hinged manner toward both sides of a virtual line configured to extend in one direction, and, when the covers are opened, the mounting region may be exposed outside.

In a further preferred embodiment, a solar panel may be disposed on an upper surface of the cover, and the solar panel may be electrically connected to the storage.

In another further preferred embodiment, a protrusion may be provided on the mounting region, and the protrusion may come into contact with a charging terminal provided on the drone to supply the power stored in the storage to the drone.

In still another further preferred embodiment, the protrusion may include a mark recognizable by a camera provided in the drone, and the mark may be configured such that the drone recognizes a landing position thereof.

In yet another further preferred embodiment, the protrusion may include fixing parts configured to pop up in a protruding direction of the protrusion, and, when the drone is placed on the protrusion, the fixing parts may pop up.

In still yet another further preferred embodiment, the mobile drone station may further include a controller configured to perform power supply through the protrusion and control of the cover, and the controller may determine whether landing of the drone is completed depending on whether the charging terminal comes into contact with the protrusion, and controls operation of the fixing parts.

In a still further preferred embodiment, a communication unit configured to transmit information about a position of the trailer to the drone may be provided in the trailer, and the communication unit may transmit information about a movement path of the vehicle, received from a vehicle controller mounted in the vehicle, to the drone.

In a yet still further preferred embodiment, a communication unit configured to perform communication with the drone may be provided in the trailer, and the communication unit may serve to relay data transmission between the drone and a computing device outside the trailer.

In another further preferred embodiment, a controller configured to control opening and closing of the cover and operation of the storage may be disposed in the trailer, and a vehicle controller configured to control the vehicle may not drive the vehicle, when the vehicle controller receives information indicating that the cover is in an opened state from the controller.

In still another further preferred embodiment, the cover may include two wing-door type covers configured to be moved in a hinged manner toward both sides of a virtual line configured to extend in one direction, and each of the covers may include a first connector connected to the mounting region, a first cover connected to the first connector, a second connector connected to the first cover, and a second cover connected to the second connector.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
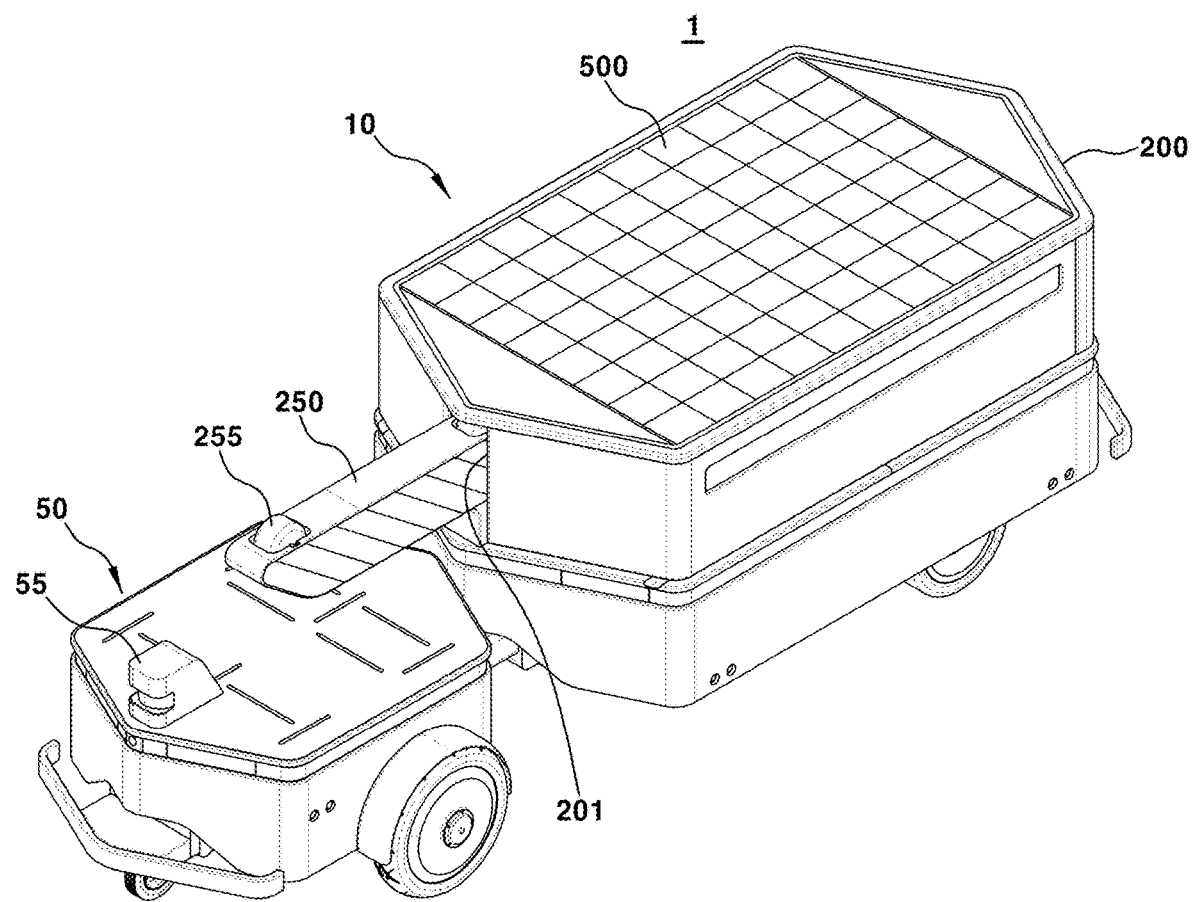
FIG. 1 is a perspective view showing a drone station according to one embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving the same will become apparent from the descriptions of the embodiments hereinbelow with reference to the accompanying drawings. However, the present disclosure is not limited to the embodiments disclosed herein and may be implemented in various different forms, and these embodiments are provided to make the description of the present disclosure thorough and to fully convey the scope of the present disclosure to those skilled in the art. It is to be noted that the scope of the present disclosure is defined only by the claims. In the following description of the embodiments, the same or similar elements are denoted by the same reference numerals even though they are depicted in different drawings.

In the following description of the embodiments, the terms " . . . section," " . . . unit," " . . . module," etc. means a unit that processes at least one function or operation, which may be implemented by hardware, software, or a combination of hardware and software.

In addition, in the following description of the embodiments, terms, such as "first" and "second", are used only to distinguish various elements from each other because the names of the elements are the same, and do not imply a sequence or order unless clearly indicated by the context.

The detailed description is illustrative of the present disclosure. In addition, the detailed description is intended to illustrate exemplary embodiments of the present disclosure, and the present disclosure may be used in various other combinations, modifications, and environments. That is, changes or modifications can be made within the scope of the disclosure disclosed in the description, the scope of the concept of the disclosure, a scope equivalent to the disclosed content, and/or the scope of technology or knowledge in the art. The following embodiments illustrate the best mode for implementing the technical idea of the present disclosure, and various changes required for specific application fields and uses of the present disclosure are also possible. Accordingly, the following detailed description of the present disclosure is not intended to limit the disclosure to the disclosed embodiments. In addition, the appended claims should be construed to include other embodiments.

Figure 2:
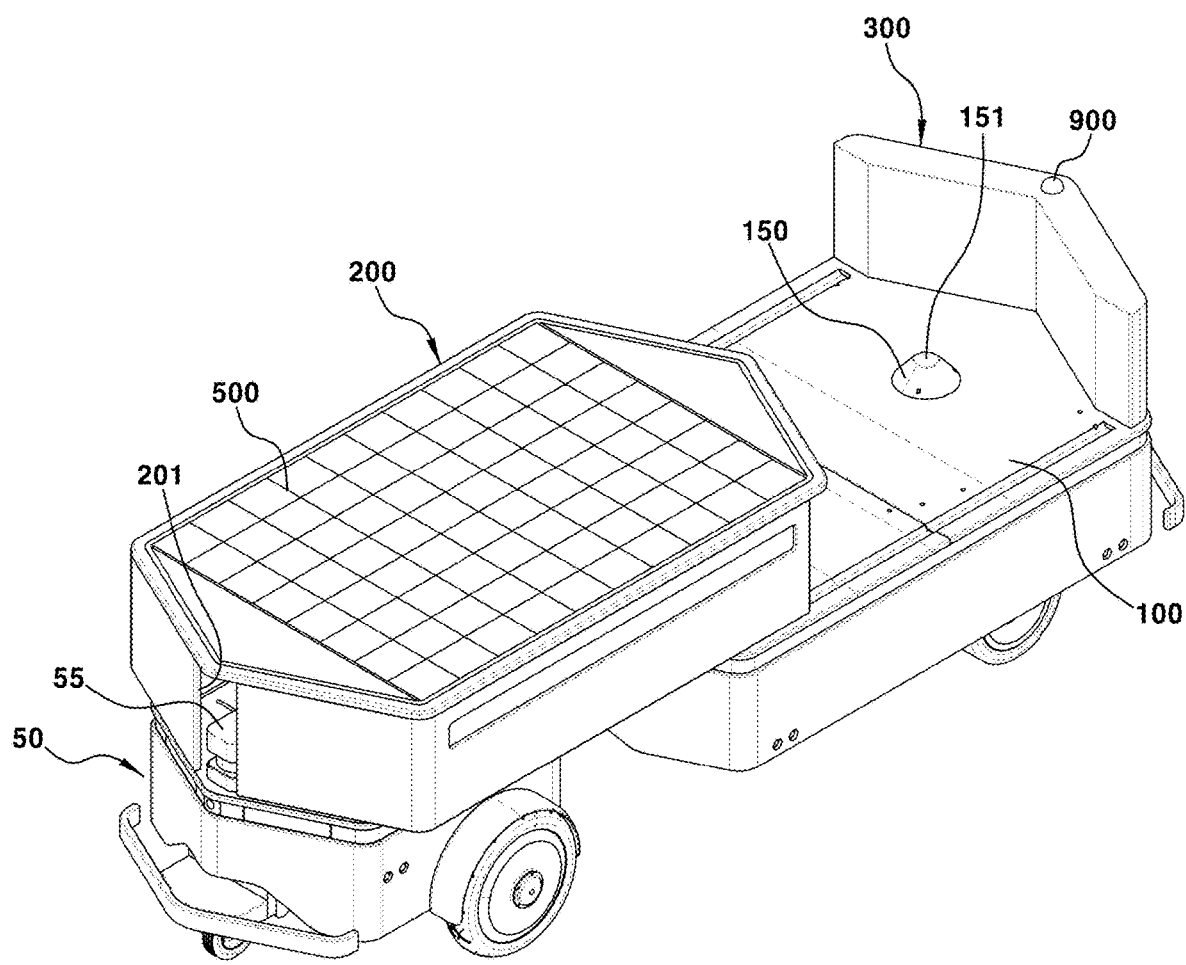
FIG. 2 is a perspective view showing a state in which a cover of the drone station according to one embodiment of the present disclosure is open.

FIG. 1 is a perspective view showing a drone station according to one embodiment of the present disclosure, and FIG. 2 is a perspective view showing a state in which a cover of the drone station according to one embodiment of the present disclosure is opened.

Referring to FIGS. 1 and 2, a drone station 1 may include a trailer 10 and a vehicle 50. The drone station 1 may be used to improve mobility of a drone whose flight time is limited due to the limitations of battery technology, and to relay various data (images and videos) acquired by the drone or analyze the data directly on site. For example, the drone may include an unmanned aerial vehicle (UAV) or an urban air mobility (UAM) aircraft.

The trailer 10 may be connected to the vehicle 50 to be movable. The trailer 10 may include separate wheels and be towed by movement of the vehicle 50. The trailer 10 may include a mounting region 100, a cover 200, and a module 300. A storage for supplying power to the vehicle 50 or the drone may be disposed in the trailer 10. A description of the storage will be given later.

The mounting region 100 may mean a space in which the drone is landed. The surface of the mounting region 100 may be flat. Protrusions 150 that protrude upward from the surface of the mounting region 100 may be provided on the mounting region 100. A plurality of protrusions 150 may be provided on the mounting region 100. The protrusions 150 may serve to inform the drone of a position where the drone is to be placed and supply power to a battery mounted in the drone after the drone has been placed on the mounting region 10. The protrusions 150 may supply power to the battery mounted in the drone in a wireless charging manner. The protrusion 150 may include a mark 151 that is recognizable by a camera mounted in the drone. The drone may recognize the protrusions 150 or the marks 151 to recognize the exact position where the drone is to be placed.

The cover 200 may be opened to expose the mounting region 100 to the outside. The cover 200 may be opened before the drone is placed on the mounting region 100. The cover 200 may be moved in a sliding manner along a cover guide 250 fixed to the trailer 10 or the mounting region 100. The cover guide 250 may extend in one direction. In the state in which the vehicle 50 and the trailer 10 are aligned in a line, the cover 200 may extend toward the vehicle 50. When the cover 200 is moved in one direction, the mounting region 100 may be exposed to the outside. The cover guide 250 may include at least one roller 255. Preferably, at least two rollers 255 may be provided. The rollers 255 may be disposed on the upper surface of the cover guide 250. The upper surface of the cover guide 250 may be in a direction of facing a solar panel 500 provided on the cover 200. That is, the rollers 255 may be disposed on the upper surface of the cover guide 250, and come into contact with the inner surface of the cover 200. The cover 200 may be moved by the operation of the rollers 255. If the cover 200 is moved along the cover guide 250 and placed above the vehicle 250, the lower end of the cover 200 may be spaced apart from the upper surface of the vehicle 50.

The cover 200 may have an opening 201 configured to avoid interference with the cover guide 250 in the closed state of the cover 200 and to avoid interference with an autonomous driving module 55 mounted on the vehicle 50 in the opened state of the cover 200. In the closed state of the cover 200, the cover guide 250 may be exposed to the outside of the cover 200 through the opening 201. In the opened state of the cover 200, the cover guide 250 may not be exposed to the outside of the cover 200, and a part of the autonomous driving module 55 may be exposed to the outside of the cover 200 through the opening 201. That is, in the completely opened state of the cover 200, the cover guide 250 and a part of the autonomous driving module 55 may be located within the cover 200. In the closed state of the cover 200, a space between the mounting region 100 and the cover 200 may be used as a place where the drone is stored.

The module 300 may include various devices for controlling the drone station 1. The module 300 may be disposed on the mounting region 100. Various kinds of devices for communication or control of the cover 200 may be arranged in the module 300. The module 300 may be disposed on the other side of the mounting region 100 opposite to one side where the cover guide 250 is disposed in one direction. That is to say, if the cover 200 is located on the mounting region 100, the module 300 may be provided in a direction opposite to the direction in which the cover guide 250 extends from the mounting region 100, thereby being capable of blocking one side of the cover 200. In the closed state of the cover 200, the cover 200 and the module 300 may come into contact with each other to seal the space between the cover 200 and the mounting region 100.

The solar panel 500 may be disposed on the upper surface of the cover 200. The solar panel 500 may supply power to the storage mounted in the trailer 10. As one example, the solar panel 500 and the storage may be electrically connected to each other through a terminal for charging provided on the inner surface of the cover 200 and a device for power supply connected to the terminal. As another example, the solar panel 500 and the storage may be connected through a cable that may be connected thereto through the exterior of a vehicle, or a cable that extends along the inner wall of the cover 200.

The vehicle 50 may mean a vehicle capable of autonomous driving or remote driving. The vehicle 50 may tow the trailer 10. Physical connection between the vehicle 50 and the trailer 10 may be released. The vehicle 50 may include the autonomous driving module 55 for obtaining information for autonomous driving. The autonomous driving module 55 may be disposed on the vehicle 50 to detect an area in front of the vehicle 50. For example, the autonomous driving module 55 may include a lidar, a camera, a radar, and various types of position recognition devices.

According to one embodiment of the present disclosure, even if it is difficult for the drone to move to a charging station, the mobile drone station 1 may be moved to the position of the drone, thereby being capable of improving mobility of the drone.

According to one embodiment of the present disclosure, the vehicle 50 may tow the trailer 10 on which the drone is placed to a place or remote area that is difficult for people to access through a remote driving or autonomous driving function.

According to one embodiment, the drone may stably land and the battery mounted in the drone may be wirelessly charged through the protrusions 150 capable of performing wireless charging, so that unmanned charging of the drone may be implemented even if a person does not directly charge the battery mounted in the drone.

Figure 3:
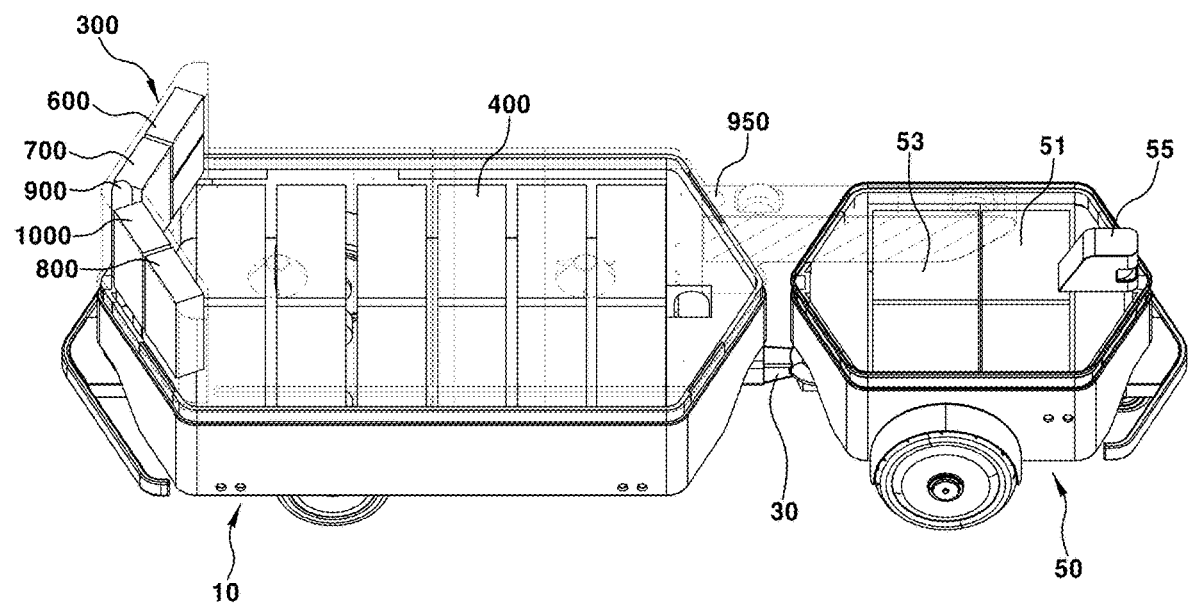
FIG. 3 is a view illustrating a module and a storage of the drone station according to one embodiment of the present disclosure.

FIG. 3 is a view illustrating the module and the storage of the drone station according to one embodiment of the present disclosure.

Referring to FIGS. 1 to 3, a storage 400 configured to store power may be placed in the trailer 10. For example, the storage 400 may be a high voltage battery. The storage 400 may supply power to the drone in contact with the protrusion 150 or may supply power to a vehicle battery 53 mounted in the vehicle 50. The storage 400 may be disposed in the lower portion of the mounting region 100. The storage 400 may be charged through a charging terminal separately provided in the trailer 10. The storage 400 may be charged through the solar panel 500.

The protrusion 150 may come into contact with a charging terminal provided in the drone so as to supply power stored in the storage 400 to the drone. When the drone lands on the mounting region 100, the charging terminal of the drone may come into physical contact with the protrusion 150. The protrusion 150 may supply power to the drone in a wireless charging manner.

The vehicle 50 may include a vehicle controller 51 for autonomous driving or remote driving, the vehicle battery 53 configured to supply power required to move the vehicle 50, the autonomous driving module 55 configured to collect information for autonomous driving, and a motor configured to drive the vehicle 50. The vehicle controller 51 may control the vehicle 50 in consideration of information obtained from the autonomous driving module 55, information input by a user, GPS information, etc.

The vehicle 50 and the trailer 10 may be connected through a towing device 30. The power stored in the storage 400 may be supplied to the vehicle battery 53 of the vehicle 50 or the motor configured to supply driving force to the vehicle 50 through a cable, an electrical connection terminal, etc., which are installed in the towing device 30.

A communication unit 600 for communication between the drone station 1 and the drone, a drone controller 700 configured to process data acquired from the drone, a black box 800, a first power supply device 900, and a controller 1000 configured to control components related to the trailer 10 including the cover 200 may be disposed in the module 300. The drone controller 700 may perform data processing and analysis to control the drone. In addition, the drone controller 700 may process and analyze data acquired by the drone. The drone may capture high-resolution images and videos, and in order to process the images and videos, a computing device capable of relaying the data to another computing device or analyze and process the data on site may be required. The data processed by the drone controller 700 may be transmitted to the drone or another external computing device through the communication unit 600. For example, the other computing device may include a computing device or terminal that controls a central control center, the drone, or the drone station 1. The black box 800 may store data related to driving of the drone station 1. The vehicle controller 51 may communicate with the controller 1000 by wire or wirelessly.

The first power supply device 900 may be electrically connected to the solar panel 500 and the storage 400. The first power supply device 900 may supply power generated by the solar panel 500 to the storage 400. One end of the first power supply device 900 may be exposed to the outside of the module 300 and come into physical contact with a terminal connected to the solar panel 500. The other end of the first power supply device 900 may be connected to the storage 400. In the storage 400, battery modules may be connected in series and parallel to control voltage and capacity. The storage 400 may include an appropriate fuse and protection circuit to prevent overcurrent and short circuit, and may include an inverter, a converter, and a power supply device to store the power supplied from the solar panel 500 and supply the power to the drone through the protrusion 150. Accordingly, the storage 400 may respond to various charging standards of drones and power capacities of various charging devices.

Each of the drone controller 700 and the controller 1000 may include a processor and a memory for processing and analyzing data. The processor may have one or more cores, and may include a processor for data analysis and deep learning, such as a central processing unit (CPU), a general-purpose graphics processing unit (GPGPU), a tensor processing unit (TPU), or an application processor (AP) of a computing device. One or more processors may perform control to process input data depending on predefined operation rules or artificial intelligence models stored in the memory. If one or more processors are artificial intelligence-dedicated processors, the artificial intelligence-dedicated processors may be designed with a hardware structure specialized for processing a specific artificial intelligence model.

The processor may read a computer program or command stored in the memory and control the drone and the drone station 1 according to this embodiment. The memory may store various information and tables required to operate the vehicle 50 and process the data of the drone. The memory may include at least one type of storage medium among a flash memory type, a hard disk type, a multimedia card micro type, a card type (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. In addition, the memory may include a random type of computer-readable recording medium well known in the technical field to which the present disclosure pertains. The description of the above-described memory is only an example, and the present disclosure is not limited thereto.

Figure 4:
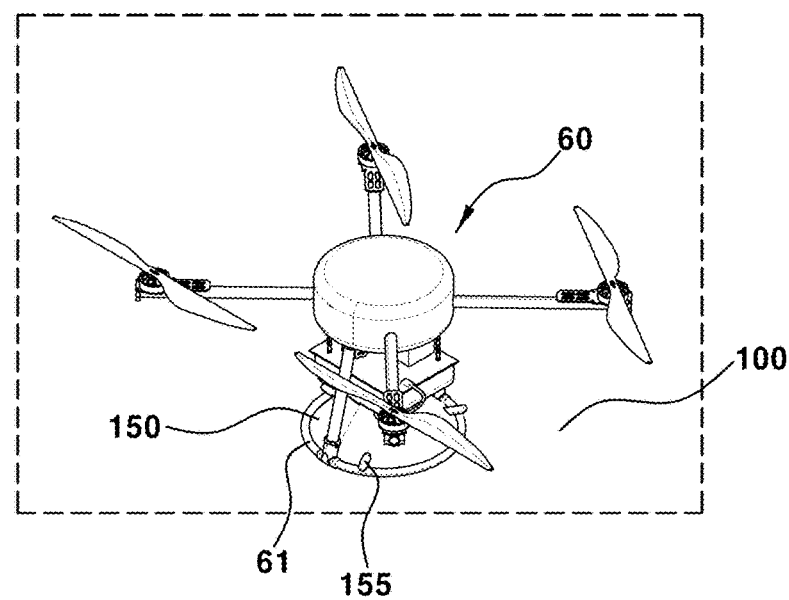
FIG. 4 is a view showing fixing parts for fixing the drone placed on the drone station according to one embodiment of the present disclosure.
Figure 5:
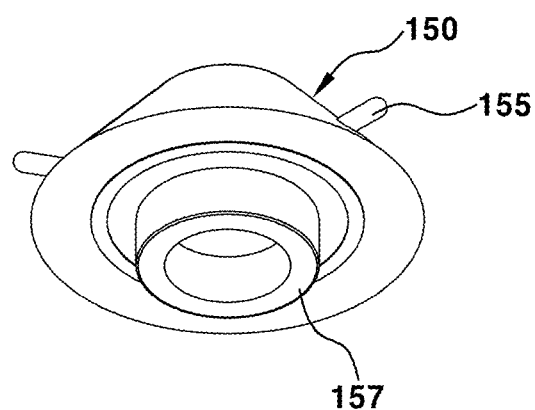
FIG. 5 is a view showing a detachable protrusion according to one embodiment of the present disclosure.
Figure 6:
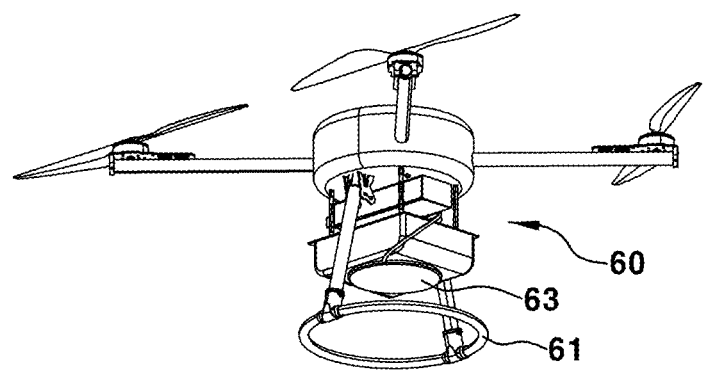
FIG. 6 is a view showing a drone capable of being placed on the drone station according to one embodiment of the present disclosure.

FIG. 4 is a view showing fixing parts for fixing the drone placed on the drone station according to one embodiment of the present disclosure, FIG. 5 is a view showing the detachable protrusion according to one embodiment of the present disclosure, and FIG. 6 is a view showing a drone capable of being placed on the drone station according to one embodiment of the present disclosure.

Referring to FIGS. 1, 3, and 6, a drone 60 may include a ring part 61 for stable support of the drone 60 upon landing, and a charging terminal 63 for charging a battery mounted in the drone 60. If the drone 60 lands on the mounting region 100, the ring part 61 disposed at the bottom of the drone 60 may come into contact with the protrusion 150 or the mounting region 100. Specifically, when the protrusion 150 is inserted into the ring part 61 of the drone 60, landing of the drone 60 may be completed. The protrusion 150 may come into contact with the charging terminal 63 so as to perform charging. For example, the charging terminal 63 may include a pad for wireless charging.

The protrusion 150 may include fixing parts 155 that pop up in a direction in which the protrusion 150 protrudes. The fixing parts 155 may be withdrawn in a direction perpendicular to a direction of facing upward from the upper surface of the mounting region 100. For example, the fixing parts 155 may be provided in plural. If the drone 60 is placed on the protrusion 150, the fixing parts 155 may pop up to fix the drone 60 so that the drone 60 is not be separated from the mounting region 10. The fixing parts 155 may protrude toward the upper portion of the ring part 61 of the drone 60, thereby being capable of preventing the drone 60 from being moved in a direction away from the mounting region 100. That is to say, the ring part 61 may be disposed in a space between the fixing parts 155 and the mounting region 100 so that the drone 60 may be fixed. In addition, because the conical protrusion 150 is inserted into the ring part 61, the drone 60 may be also fixed in the left and right directions.

For example, if the protrusion 150 and the charging terminal 63 of the drone 50 come into contact with each other, the fixing parts 155 may protrude. if the protrusion 150 and the charging terminal 63 of the drone 50 come into contact with each other, the battery installed in the drone 60 may be in a chargeable state, and the fixing parts 155 may protrude for stable charging of the drone 60 and fixation of the drone 60 to the mounting region 100, and fix the ring part 61, which is a structure for supporting the drone 60.

For example, when the drone 60 lands on the protrusion 150, a wireless charging terminal of the protrusion 150 and the charging terminal 63 of the drone 60 may come into contact with each other. The wireless charging terminal may be placed at the end of the protrusion 150. When the wireless charging terminal and the charging terminal 63 come into contact with each other, a contact recognition circuit between the wireless charging terminal and the storage 400 may recognize charging contact, and simultaneously, the fixing parts 155 may be automatically operated to fix the drone 60.

The protrusions 150 may be detachably attached to the mounting region 100. The protrusion 150 may include a detachable terminal 157 that is detachably attached to the mounting region 100. The detachable terminal 157 may serve as a power supply device so that power from the storage 400 in the trailer 10 may be transmitted to the drone 60 therethrough. In addition, the detachable terminal 157 may serve as a signal transmission terminal so that a signal for controlling operation of the fixing parts 155 may be transmitted therethrough.

According to one embodiment of the present disclosure, because the drone 60 is capable of being fixed to the trailer 10 by the fixing parts 155 provided on the protrusion 150, the drone 60 may be stably charged. In addition, because the drone 60 is fixed to the trailer 10, damage to the drone 60 due to separation of the drone 60 from the trailer 10 may not occur even if the trailer 10 is moving.

Figure 7:
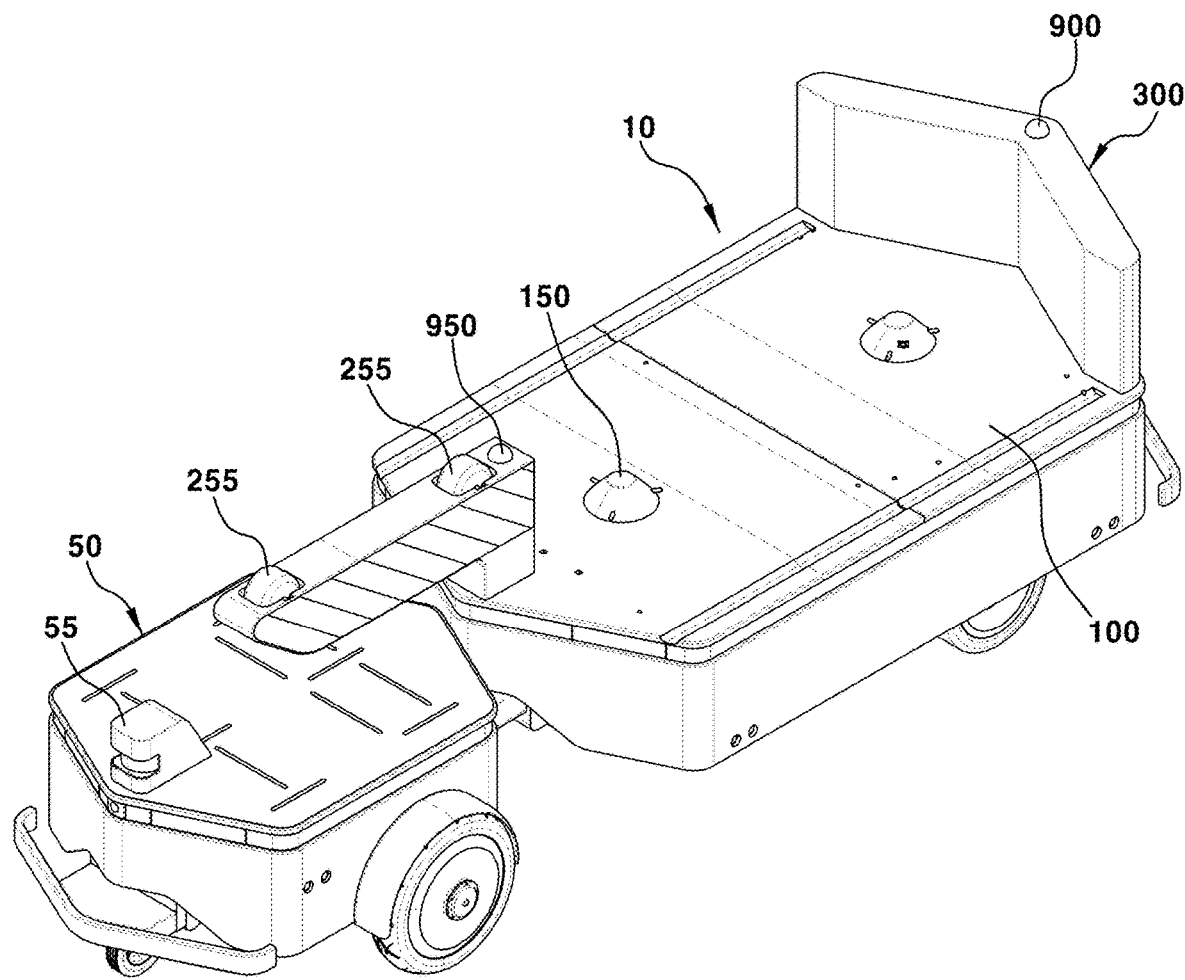
FIG. 7 is a view illustrating an electrical connection relationship between power supply devices and a solar module according to one embodiment of the present disclosure.
Figure 8:
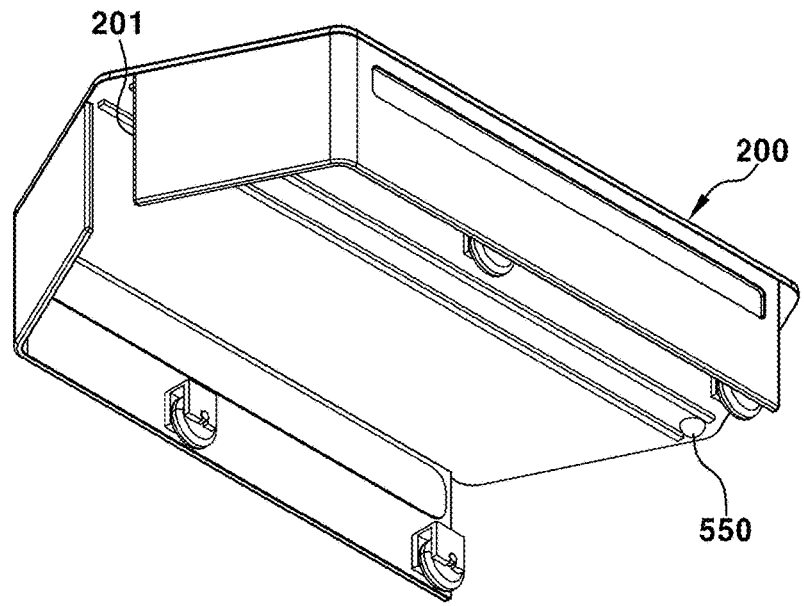
FIG. 8 is a view illustrating a panel terminal on the inner surface of the cover according to one embodiment of the present disclosure.

FIG. 7 is a view illustrating an electrical connection relationship between power supply devices and the solar module according to one embodiment of the present disclosure, and FIG. 8 is a view illustrating a panel terminal on the inner surface of the cover according to one embodiment of the present disclosure. FIG. 7 shows a state in which the cover of FIG. 1 is omitted.

Referring to FIGS. 1, 3, 7, and 8, the solar panel 500 may supply power generated through the first power supply device 900 and a second power supply device 950 to the storage 400. A panel terminal 550 electrically connectable to the first power supply device 900 and the second power supply device 950 may be provided on the inner surface of the solar panel 500. The first power supply deice 900 may be disposed in the module 300.

The first power supply device 900 may extend in a direction from the solar panel 500 toward the mounting region 100. One end of the first power supply device 900 may protrude to the outside of the module 300 and come into contact with the panel terminal 550 provided on the inner surface of the solar panel 500 to be electrically connected to the panel terminal 550. For example, the first power supply device 900 may include a protruding terminal that comes into contact with the solar panel 500, and a wire connected to the storage 400.

The second power supply device 950 may be provided on the cover guide 250. In other words, the second power supply device 950 may electrically connect the solar panel 500 and the storage 400, and one end of the second power supply device 950 may protrude from the cover guide 250. The end of the second power supply device 950 may come into contact with the panel terminal 550 provided on the inner surface of the solar panel 500 so as to be electrically connected to the panel terminal 550. For example, the second power supply device 950 may be provided to extend in the direction from the solar panel 500 toward the mounting region 100 within the cover guide 250 or along the outer surface of the cover guide 250, but one end of the second power suppl device 950 may come into physical contact with the panel terminal 550 provided on the inner surface of the solar panel 500.

The panel terminal 550 of the solar panel 500 may be provided on one surface of the solar panel 500 in the direction in which the cover guide 250 extends. Specifically, the panel terminal 550 of the solar panel 500 may be provided at a position where the panel terminal 550 is capable of coming into contact with the first power supply device 900 provided on the module 300 in the closed state of the cover 200. That is, the panel terminal 550 of the solar panel 500 may be provided at the rear end of the inner surface of the solar panel 500.

For example, if the cover 200 is in the closed state, the panel terminal 550 of the solar panel 500 may come into contact with the first power supply device 900. Power generated through the solar panel 500 may be supplied to the storage 400 through the first power supply device 900. If the cover 200 is in the closed state, the first power supply device 900 may be electrically connected to the panel terminal 550 of the solar panel 500 and thus serve to supply the power generated by the solar panel 500 to the storage 400.

For example, if the cover 200 is in the opened state, the panel terminal 550 of the solar panel 500 may come into contact with the second power supply device 950. Power generated through the solar panel 500 may be supplied to the storage 400 through the second power supply device 950. If the cover 200 is in the opened state, the second power supply device 950 may be electrically connected to the panel terminal 550 of the solar panel 500 and thus serve to supply the power generated by the solar panel 500 to the storage 400.

According to one embodiment of the present disclosure, in the closed state or completely opened state of the cover 200, power generation by the solar panel 500 and power supply from the solar panel 500 to the storge 400 may be performed. However, because the power generation by the solar panel 500 and the power supply from the solar panel 500 to the storge 400 may be unstable while the trailer 10 is moving, the panel terminal 550 of the solar panel 500 may not come into contact with either the first power supply device 900 or the second power supply device 950 while the trailer 10 is moving. Thereby, stable power generation by the solar panel 500 and stable power supply to the storage 400 may be implemented.

Figure 9:
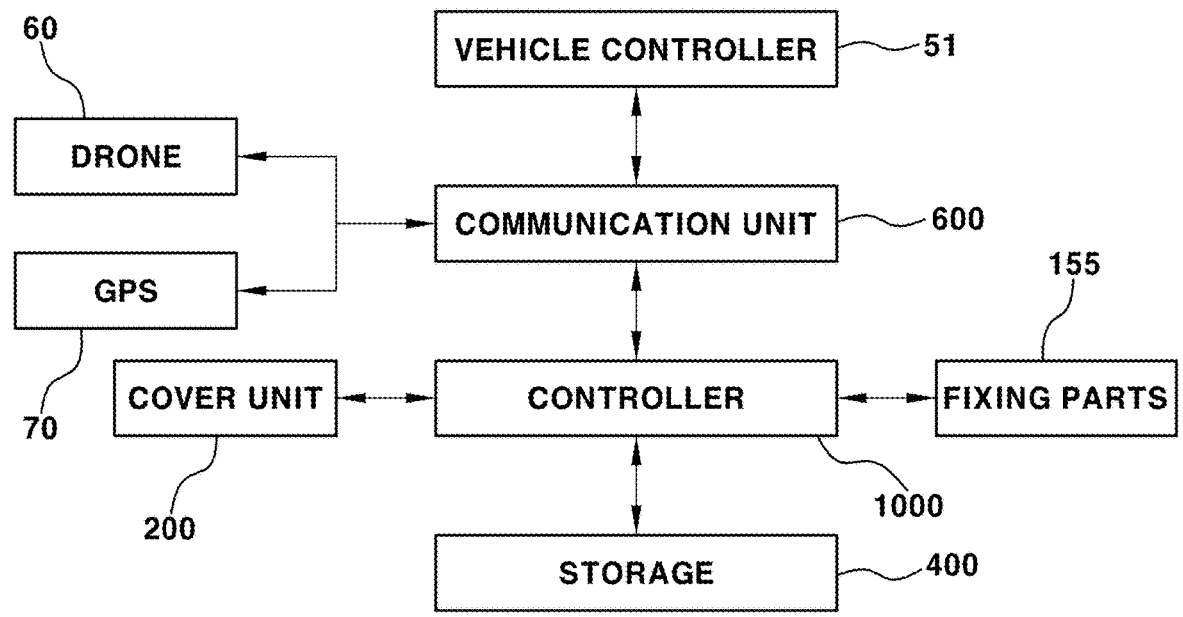
FIG. 9 is a block diagram illustrating the functions of a controller that controls the drone station according to one embodiment of the present disclosure.

FIG. 9 is a block diagram illustrating the functions of the controller that controls the drone station according to one embodiment of the present disclosure.

Referring to FIGS. 1 to 9, the controller 1000 configured to control the trailer 10 may be mounted in the module 300. The controller 1000 may control operation of the cover 200, operation of the fixing parts 155, operation of the storage 400, and communication with the drone 60.

The communication unit 600 may transmit information about the position of the trailer 10 toward the drone 60. The communication unit 600 may receive data about the position of the drone 60, transmitted by the drone 60, and data acquired by the drone 60, and relay the received data to the controller 1000 or another computing device outside the drone station 1. Because the communication range of the drone 60 is limited, in order to supplement the limited communication range of the drone 60, the communication unit 600 mounted in the drone station 1 may serve as a relay between the drone 60 and the other computing device beyond serving to simply receive and transmit data.

The communication unit 600 may receive position data acquired through the drone 60 and a GPS system 70 and transmit the received data to the vehicle controller 51. The vehicle controller 51 may perform autonomous driving using the data about the position of the drone 60 and the position of the vehicle 50. In addition, information about a movement path generated by the vehicle controller 51 may be transmitted to the drone 60 by the communication unit 600.

As an example, the drone 60 may communicate with the communication unit 600 in order to determine a point where the drone 60 wants to land, and the communication unit 600 may transmit information on at least one point where the drone 60 wants to land to the vehicle controller 51. The vehicle controller 51 may generate a movement path in consideration of information about a point to which the vehicle 50 is capable of moving, among the at least one point where the drone 60 wants to land, and information about the movement path may be transmitted to the drone 60 through the communication unit 600.

As another example, if the vehicle 50 is moved by remote driving, information about the movement path of the vehicle 50, which is determined by a remote control center, may be transmitted to the drone 60 through the communication unit 600.

The vehicle controller 51 may confirm the positions of the vehicle 50 and the drone 60 through real-time communication with the drone 60. The vehicle controller 51 and the drone 60 may share information about a point where the drone 60 is capable of landing, the point where the drone 60 wants to land, the point where the vehicle 50 is capable of moving, etc., and the movement paths of the vehicle controller 51 and the drone 60 may be determined based on the shared information.

The controller 1000 may control the cover 200 based on information about the position of the drone 60 and whether the drone 60 has landed. For example, if the drone 60 wants to land and the position of the drone 60 is within a predetermined distance from the position of the drone station 1 or the position of the trailer 10, the controller 1000 may opened the cover 200 to expose the protrusions 150. The controller 1000 may opened the cover 200 if the drone 60 is not placed on the protrusion 150 even when the vehicle 50 is moving. However, even if charging of the drone 60 by the protrusion 150 is in progress, the controller 1000 may opened the cover 200.

The controller 1000 may determine whether landing of the drone 60 is completed based on whether the charging terminal 53 of the drone 60 comes into contact with the protrusion 150. If the charging terminal 53 of the drone 60 comes into contact with the protrusion 150, the controller 1000 may determine that landing of the drone 60 is completed. If landing of the drone 60 is completed, the controller 1000 may control operation of the fixing parts 155 to fix the drone 60 to the mounting region 100. In order for the drone 60 to take off, the controller 1000 may control the fixing parts 155 to be inserted into the protrusion 150. The controller 1000 may control the fixing parts 155 and the cover 200 based on a signal for a takeoff request received from the drone 60. That is to say, when the communication unit 600 receives the signal for the takeoff request from the drone 60, the controller 1000 may opened the cover 200 and control the fixing parts 155.

For example, if the charging terminal 63 of the drone 60 comes into contact with the protrusion 150, the controller 1000 may control the storage 400 to supply power to the battery mounted in the drone 60. The controller 1000 may receive a signal for a battery charging request from the drone 60.

For example, if the vehicle controller 51 receives information indicating that the cover 200 is in the opened state from the controller 1000, the vehicle controller 51 may not operate the vehicle 50. Although the drone 60 is fixed by the fixing parts 155, if the vehicle 50 is driven on an uneven road in the opened state of the cover 200, the drone 60 may escape from the trailer 10. Therefore, for reasons of safety, the vehicle 50 may not be driven in the opened state of the cover 200.

According to one embodiment of the present disclosure, the mobile drone station 1 may perform the roles of charging the battery of the drone 60, relaying data acquired by the drone 60, and stably transporting the drone 60. The drone station 1 may compensate for the limitations of the battery of the drone 60, the limitations of the communication range of the drone 60, and the limitations of drone's own data processing and analysis capabilities.

Figure 10:
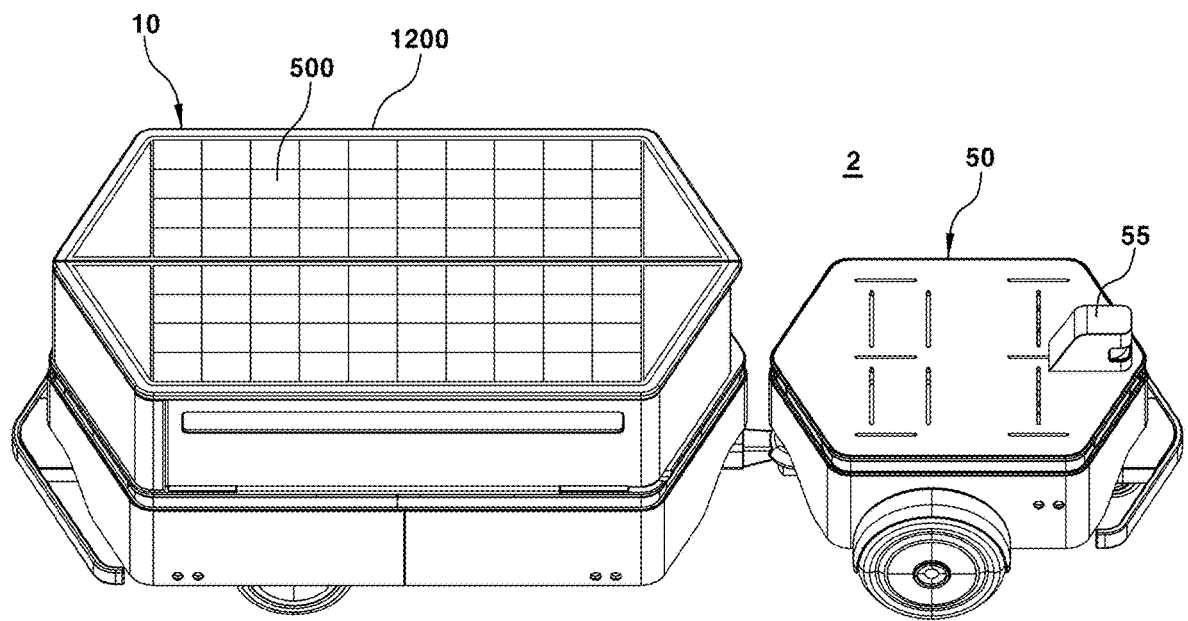
FIG. 10 is a perspective view showing a drone station according to another embodiment of the present disclosure.
Figure 11:
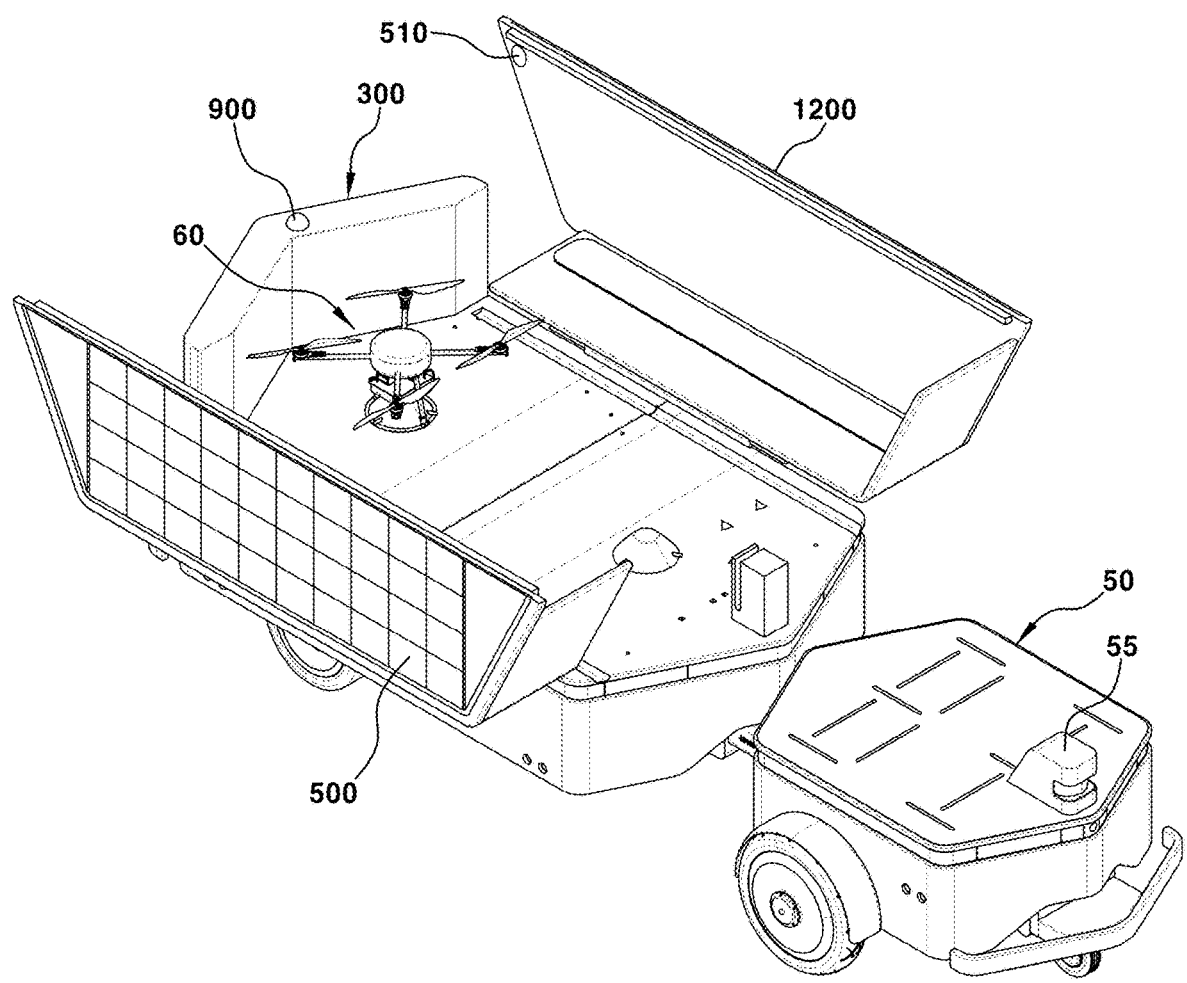
FIG. 11 is a perspective view showing a state in which covers of the drone station according to another embodiment of the present disclosure are open.

FIG. 10 is a perspective view showing a drone station according to another embodiment of the present disclosure, and FIG. 11 is a perspective view showing a state in which covers of the drone station according to another embodiment of the present disclosure are opened. For the sake of brevity, a description of redundant content will be omitted.

Referring to FIGS. 10 and 11, a drone station 2 may include a trailer 10 and a vehicle 50, and the trailer 10 may include covers 1200 that are capable of being opened in a wing-door type. In the closed state of the covers 1200, a solar panel 500 may be provided on the upper surfaces of the covers 1200. A panel terminal 510 may be provided on one side of the inner surface of the solar panel 500. The panel terminal 510 may come into contact with a first power supply device 900 provided in a module 300.

For example, in the closed state of the covers 1200, the panel terminal 510 may be in physical contact with the first power supply device 900. Therefore, power generated through the solar panel 500 may be supplied to a battery mounted in a drone placed in the trailer 10 through the first power supply device 900.

For example, in the opened state of the covers 1200, the panel terminal 510 may be physically separated from the first power supply device 900. In this case, the solar panel 500 may be deactivated.

The covers 1200 may be connected to one side and the other side of the trailer 10, respectively. That is, two covers 1200 may be opened and closed in a wing-door type. The one side and the other side of the trailer 10 may be connected to the two covers 1200 in a hinged manner. The covers 1200 may be a wing-door type so that the covers 1200 are moved in the hinged manner toward both sides of a virtual line extending in one direction. The above direction may mean a direction from the trailer 10 toward the vehicle 50 if the vehicle 50 and the trailer 10 are aligned in a line. The covers 1200 may be automatically opened and closed by at least one actuator (attached to the trailer 10.

Figure 12:
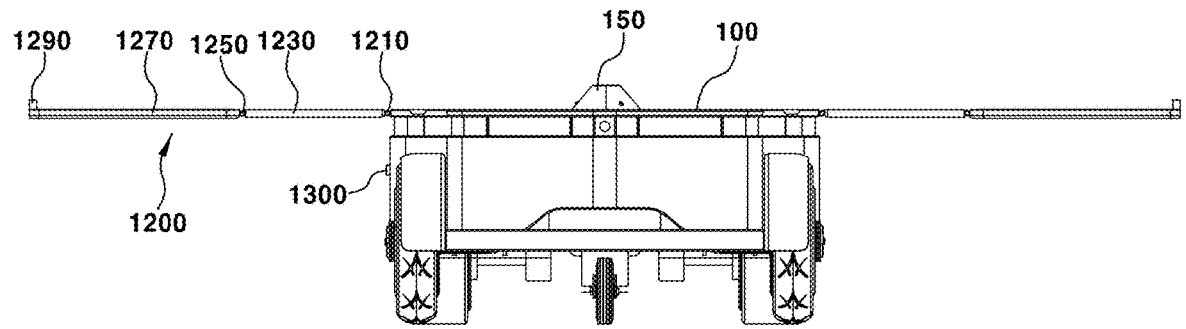
FIG. 12 is a view showing a state in which the covers according to another embodiment of the present disclosure are completely open.

FIG. 12 is a view showing a state in which the covers according to another embodiment of the present disclosure are completely opened.

Referring to FIGS. 10 to 12, each of the covers 1200 connected to one side and the other side of the trailer may include a first cover 1230 and a second cover 1270. The first cover 1230 is connected to the mounting region 100 through a first connector 1210. The first cover 1230 and the second cover 1270 may be connected through a second connector 1250. That is, the first cover 1230 and the second cover 1270 may form substantially the same plane through the first connector 1210 and the second connector 1250, which are two hinge points. In other words, in the completely opened state of the covers 1200, the inner surfaces of the covers 120 may be substantially flat.

A third connector 1290 for connection with a cover of another trailer may be provided at the end of the cover 1200. The third connector 1290 may be used, in a situation in which a plurality of trailers are disposed adjacently, to connect adjacent covers of the respective trailers when the covers are completely opened. For example, the shape of the third connector 1290 may not be particularly limited.

A sensor unit 1300 configured to detect a distance from another trailer or structure may be placed on the trailer 10. The sensor unit 1300 may measure a distance from an adjacent structure in order to prevent collision with the adjacent structure if the covers 1200 are completely opened. The position of the vehicle 50 may be controlled based on data measured by the sensor unit 1300. For example, if it is required to connect the covers 1200 of different trailers in the completely opened state of the respective covers 1200, the position of the vehicle 50 may be controlled based on the distance measured by the sensor unit 1300.

According to one embodiment of the present disclosure, if the wing-door type covers 1200 are completely opened, the inner surfaces of the covers 1200 may be flat, so that a relatively large drone may land on the mounting region 100.

Figure 13:
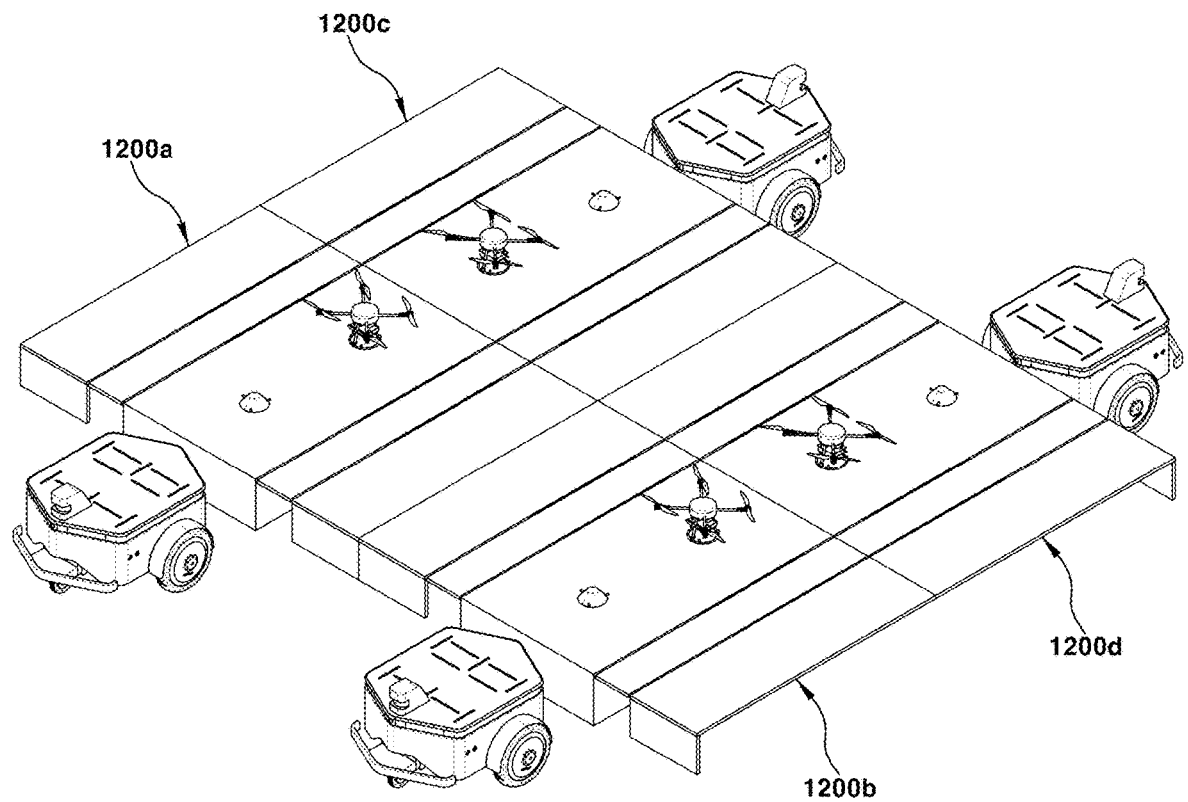
FIG. 13 is a perspective view showing a state in which covers of drone stations according to yet another embodiment of the present disclosure are combined.

FIG. 13 is a perspective view showing a state in which covers of a plurality of drone stations according to yet another embodiment of the present disclosure are combined. In FIG. 13, the configuration of a trailer excluding the covers may be substantially the same as the configuration in FIGS. 10 to 12.

Referring to FIG. 13, wing-door type covers 1200*a*, 1200*b*, 1200*c*, and 1200*d* provided on a plurality of trailers may be combined with each other to form a landing area where a large drone may land. If each of the covers 1200*a*, 1200*b*, 1200*c*, and 1200*d* is opened, the upper surfaces of the trailers may become substantially flat. However, components, such as the above-described module 300 (in FIG. 9), may be located within the mounting region of the trailer.

If the covers 1200*a*, 1200*b*, 1200*c*, and 1200*d* are combined with each other, a large landing field on which a plurality of drones may land at the same time or on which a large drone may land may be formed. Therefore, in an emergency, the large landing field may be constructed so that drones may be charged and take off and land stably even in a place where a drone landing pad is not provided.

As is apparent from the above description, according to one embodiment of the present disclosure, even if it is difficult for a drone to move to a charging station, a mobile drone station is movable to the position of the drone, thereby being capable of improving mobility of the drone.

According to one embodiment of the present disclosure, a vehicle may tow a trailer on which the drone lands to a place or remote area that is difficult for people to access through a remote driving or autonomous driving function.

According to one embodiment, protrusions capable of performing wireless charging enable stable landing of the drone and wireless charging of a battery mounted in the drone, thereby being capable of implementing unmanned charging of the drone even if a person does not directly charge the battery mounted in the drone.

According to one embodiment of the present disclosure, the drone may be fixed to the trailer by fixing parts provided on the protrusion, thereby being capable of being stably charged. In addition, because the drone is fixed to the trailer, damage to the drone due to separation of the drone from the trailer may not occur even if the trailer is moving.

According to one embodiment of the present disclosure, the mobile drone station may perform the roles of charging the battery of the drone, relaying data acquired by the drone, and stably transporting the drone. The drone station may compensate for the limitations of the battery of the drone, the limitations of the communication range of the drone, and the limitations of drone's own data processing and analysis capabilities.

According to one embodiment of the present disclosure, the drone station capable of performing real-time mutual position recognition between the trailer and the drone, communication relay, and the role of a central base station may resolve loss of the body of the drone, data loss, and the limitations of the range of use of the drone due to communication interference between the drone and an external device, communication cutoff, etc.

Although the embodiments of the present disclosure have been described with reference to the accompanying drawings, it will be understood by those skilled in the art that the present disclosure may be implemented in other specific forms without changing the technical idea or essential features thereof. Therefore, it will be understood that the above-described embodiments are only examples and are not intended to be limiting.

What is claimed is:

1. A mobile drone station comprising:
   a trailer comprising a mounting region configured such that a drone lands thereon, and a cover configured to surround the mounting region;
   a storage disposed in the trailer and configured to store power to charge a battery mounted in the drone; and
   a vehicle connected to the trailer to tow the trailer,
   wherein:
   the cover is moved along a cover guide mounted on the trailer and configured to extend in one direction; and when the cover is moved in the one direction, the mounting region is exposed outside,
   wherein the cover guide extends toward the vehicle; and when the cover is moved along the cover guide and placed above the vehicle, a lower end of the cover is spaced apart from an upper surface of the vehicle.

2. The mobile drone station of claim 1, further comprising:
   at least one roller is disposed on one surface of the cover guide; and
   the cover is moved in the one direction through the at least one roller.

3. The mobile drone station of claim 1, further comprising:
   a module configured such that devices for communication or control of the cover are mounted therein is disposed on the mounting region; and
   when the cover is located above the mounting region, the module is provided in a direction opposite to a direction of extension of the cover guide to block one side of the cover.

4. The mobile drone station of claim 1, further comprising:
   a solar panel is disposed on an upper surface of the cover; and
   the solar panel is electrically connected to the storage.

5. The mobile drone station of claim 4, further comprising:
   a module engaged with the cover is provided on the mounting region; and
   a first power supply device configured to come into electrical contact with the solar panel is disposed in the module.

6. The mobile drone station of claim 5, wherein:
   the cover is moved along a cover guide mounted on the trailer and configured to extend in one direction;

a second power supply device configured to come into electrical contact with the solar panel is provided in the cover guide;

in a closed state of the cover, the first power supply device is electrically connected to the solar panel; and in an opened state of the cover, the second power supply device is electrically connected to the solar panel.

7. The mobile drone station of claim 1, further comprising:

a protrusion is provided on the mounting region; and the protrusion comes into contact with a charging terminal provided on the drone to supply the power stored in the storage to the drone.

8. The mobile drone station of claim 7, wherein:

the protrusion comprises a mark recognizable by a camera provided in the drone; and the mark is configured such that the drone recognizes a landing position thereof.

9. The mobile drone station of claim 7, wherein:

the protrusion comprises fixing parts configured to pop up in a protruding direction of the protrusion; and when the drone is placed on the protrusion, the fixing parts pop up.

10. The mobile drone station of claim 9, further comprising a controller configured to perform power supply through the protrusion and control of the cover, wherein the controller determines whether landing of the drone is completed depending on whether the charging terminal comes into contact with the protrusion, and controls operation of the fixing parts.

11. The mobile drone station of claim 1, further comprising:

a communication unit provided in the trailer, the communication unit configured to transmit information about a position of the trailer to the drone; and a vehicle controller mounted in the vehicle, the vehicle controller configured to transmit information about a movement path of the vehicle to the communication unit, wherein the communication unit transmits information about a movement path of the vehicle to the drone.

12. The mobile drone station of claim 1, further comprising:

a communication unit configured to perform communication with the drone is provided in the trailer; and the communication unit serves to relay data transmission between the drone and a computing device outside the trailer.

13. A mobile drone station comprising:

a trailer comprising a mounting region configured such that a drone lands thereon, and a cover configured to surround the mounting region;

a storage disposed in the trailer and configured to store power to charge a battery mounted in the drone; and a vehicle connected to the trailer to tow the trailer;

a controller configured to control opening and closing of the cover and operation of the storage is disposed in the trailer; and a vehicle controller configured to control the vehicle does not drive the vehicle, when the vehicle controller receives information indicating that the cover is in an opened state from the controller.

14. A mobile drone station comprising:

a trailer comprising a mounting region configured such that a drone lands thereon, and a cover configured to surround the mounting region;

a storage disposed in the trailer and configured to store power to charge a battery mounted in the drone;

a vehicle connected to the trailer to tow the trailer;

a solar panel is disposed on an upper surface of the cover, the solar panel is electrically connected to the storage;

a module engaged with the cover is provided on the mounting region; and a first power supply device configured to come into electrical contact with the solar panel is disposed in the module.

* * * * *